United States Patent

Keller et al.

[11] 4,039,072
[45] Aug. 2, 1977

[54] APPARATUS AND METHOD FOR CONVEYING MOLDED BRIQUETTES FROM A PRESS TO BED PLATES VIA AN INCLINED CONVEYANCE TRACK

[75] Inventors: Werner Keller; Karl Schafer, both of Ibbenburen, Germany

[73] Assignee: C. Keller & Co., Laggenbeck, Germany

[21] Appl. No.: 606,111

[22] Filed: Aug. 20, 1975

[30] Foreign Application Priority Data

Aug. 21, 1974 Germany .......................... 2440035

[51] Int. Cl.² ............................................. B65G 47/00
[52] U.S. Cl. .................................... 198/429; 198/427; 198/436; 214/6 P
[58] Field of Search .................. 198/31 AB, 31 R, 24, 198/20 R, 21, 426, 429, 427, 436; 214/6 A, 6 P

[56] References Cited

U.S. PATENT DOCUMENTS

| | | | |
|---|---|---|---|
| 2,734,643 | 2/1956 | MacRae | 198/21 X |
| 2,880,558 | 4/1959 | Wilson | 214/6 P |
| 2,886,929 | 5/1959 | Villemont | 198/20 R X |
| 3,247,981 | 4/1966 | Johnson | 214/6 P |
| 3,456,773 | 7/1969 | Titmas | 198/20 R |

FOREIGN PATENT DOCUMENTS 647,009  10/1962  Italy .............................. 198/31 AB Primary Examiner—Evon C. Blunk
Assistant Examiner—Douglas D. Watts
Attorney, Agent, or Firm—Mason, Mason & Albright

[57] ABSTRACT

A system for conveying molded bricks known as briquettes from a press to a bed plate wherein the briquettes are each conveyed by a plurality of spaced parallel belts to above a conveyor which carries the bed plates under the briquettes supported by the conveyor belts. An inclined substantially coplanar conveyance track which includes elongated rollers has its after portion periodically raised whereby the rollers located in the after portion penetrate upwardly between the belts carrying the briquettes thus lifting the briquettes from the belt. A removal mechanism pushes the briquettes down the rollers of the conveyance track onto a removal plate which pivots with the conveyance track and extends therefrom at a slight incline, the briquettes being received by the main conveyor carrying the bed plates whereby the briquettes are pushed over the conveyance track and onto the bed plate. The removal mechanism is reciprocating and the main conveyor moves intermittently and simultaneously with the removal mechanism except, preferably, the removal mechanism stops slightly before the main conveyor stops which provides an interval between rows of briquettes received on the bed plates.

7 Claims, 3 Drawing Figures

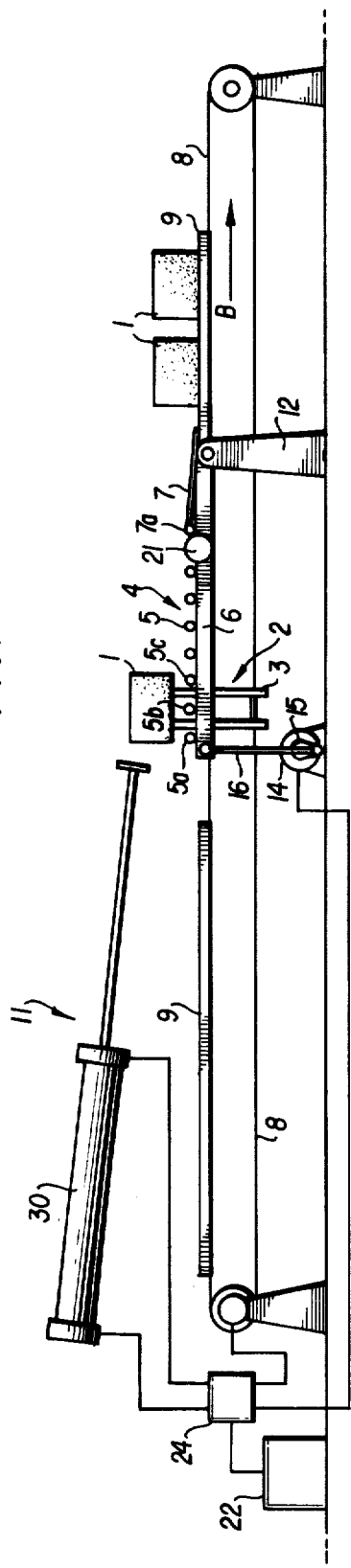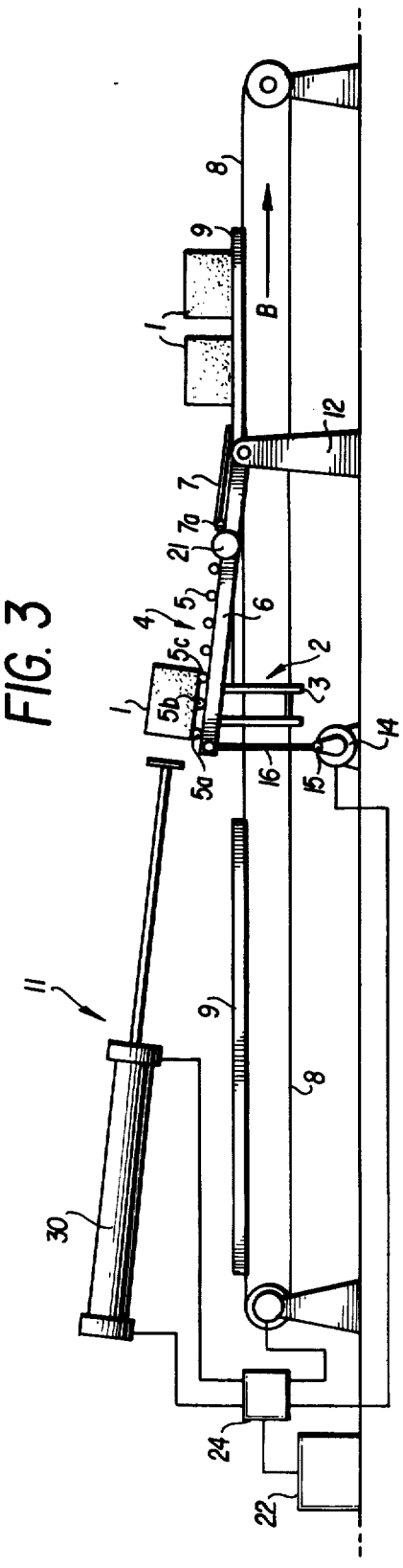

APPARATUS AND METHOD FOR CONVEYING MOLDED BRIQUETTES FROM A PRESS TO BED PLATES VIA AN INCLINED CONVEYANCE TRACK

BACKGROUND OF THE INVENTION

The invention relates to a system for conveying briquettes which have been previously formed in a press to bed plates wherein a conveyor carries the briquettes above a further conveyor which moves at right angles to the movement of the briquettes, the briquettes being transferred from the first conveyor to the further conveyor by a conveyance track which has an inclined position relative to the bed plates and is reciprocated from above to below and vice versa relative to the first conveyor for removing the briquettes therefrom.

An apparatus and method are already known for conveying briquettes produced in a press to bed plates whereby the briquettes are carried on a conveyor and in the final portion of the conveyor are removed therefrom at right angles to the direction they have been moving up to that point. Such briquettes so removed are received by a removable plate which first proceeds at the height of the conveyor horizontally and then slightly bends downward in the direction of the underlying bed plates. From the removal plate, which terminates immediately above the bed plates, the briquettes received are successfully transferred to the bed plates, the operating speed of removing the briquettes and the forward speed of the bed plates being the same.

A disadvantage of this known system is that the vertical surfaces of the briquettes are damaged during the removal process. The last part of the removal plate being bent, the briquettes on this part are at an angle vis-a-vis the briquettes still to follow on the horizontal part of the removal plate whereupon the surfaces of the briquettes are pushed against each other at an angle. Thus, the briquettes are not in contact along the whole surface of their sides but only in the lower part of the upright side surfaces. Inasmuch as the briquettes are at this point still in plastic condition, damage is caused by the angular contact of the briquettes with each other.

OBJECTS AND SUMMARY OF THE INVENTION

An important object of the instant invention is to improve the apparatus as described above so that damage to the surfaces of the briquettes upon the transfer to the bed plates is avoided.

This purpose is attained by providing that the conveyor carrying the briquettes comprises several spaced parallel conveyor belts and that, at right angle to such conveyor belts, a conveyance track including rollers is reciprocated to penetrate the conveyor belts, the track being constructed so that it is coplanar with the removal plate which is installed on an incline.

A characteristic of the invention is that the rollers of the conveyance track are incorporated into a frame which is pivotable around an axis adjacent to the removal plate.

The rollers of the conveyance track permit the briquettes to be carried essentially on the same plane as the removal plate at all times during the removal process. The vertical surfaces of the briquettes are thus parallel whereby damage to them is avoided.

Other objects, adaptabilities and capabilities of the invention will be appreciated by those skilled in the art from the following description, reference being had to the accompanying drawings, in which:

BRIEF DESCRIPTION OF THE DRAWINGS

FIGS. 2 and 3 respectively, are similar diagrammatic side views of the apparatus as seen in the direction of arrow A of FIG. 1, the apparatus being in different operational positions in the Figures.

DESCRIPTION OF THE PREFERRED EMBODIMENT

Figure 1:
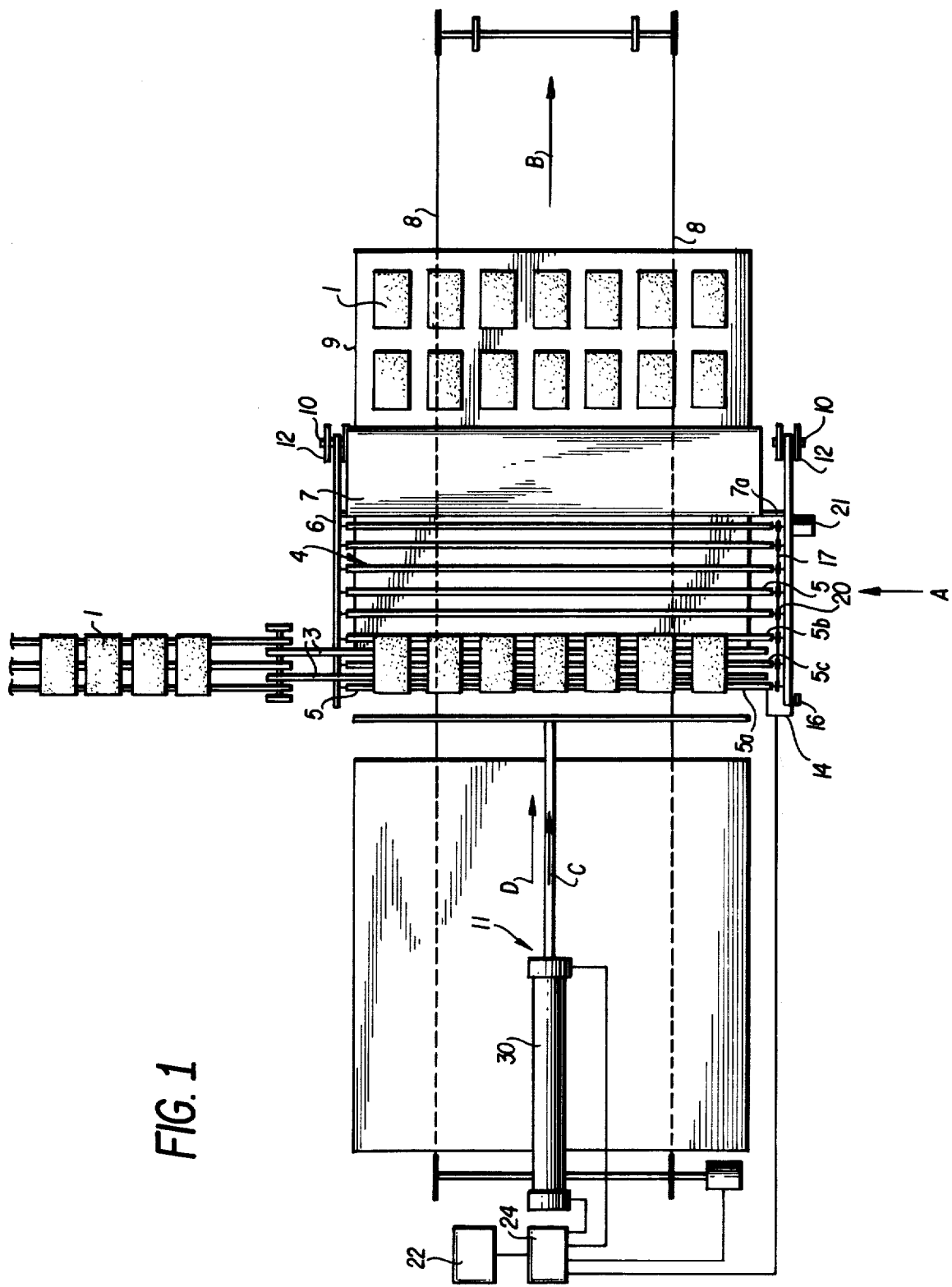
FIG. 1 is a diagrammatic representation of the apparatus and method of the invention as seen in plan view.

Referring to the drawings, the briquettes 1 are carried on a conveyor 2 from a press which forms the briquettes (not shown). Conveyor 2 includes a plurality (two) spaced apart parallel conveyor belts 3.

A roller conveyance track 4 is arranged at right angles to the conveyor belts 3. Track 4 comprises rollers 5 which each are rotatably mounted in a frame 6. Specific rollers 5a, 5b and 5c are arranged so that they may be raised and lowered between the conveyor belts. The reciprocating action of the track 4 is accomplished by means of a motor 14 which rotates a crank 15, the crank 15 of which is connected to a rod 16 pivotably connected on its upper end to the track 4 at its after end. The track 4 is pivoted at its forward end on bearings 10 which receive pins from a supporting posts 12 whereby the track 4 is pivoted at its forward portion proximate to the level of a main conveyor 8 which carries bed plates 9.

A removal plate 7 is pivotably mounted on track 4 by a hinge member 7a carried by frame 6 of track 4. When frame 6 is horizontal as seen in FIG. 2, plate 7 assumes a position slightly inclined downwardly relative to track 4.

Removal plate 7 has its free end terminate on or immediately above the main conveyor track 8 on which bed plates 9 are carried for receiving and transporting briquettes 1 in the direction of arrow B.

Frame 6 in which rollers 5 are journalled is mounted on bearings 10 carried by supports 12, thus formng a horizontal axis for pivoting frame 6 near to removal plate 7 in such a way that it can be pivoted around the axis of bearings 10 whereby rollers 5a, 5b and 5c penetrate between and extend above conveyor belts 3 and rollers 5 including rollers 5a, 5b and 5c are essentially coplanar with removal plate 7.

Above track 4 and removal plate 7, a removal device 11 is arranged which moves briquettes 11 from roller track 4 via removal plate 7 onto bed plates 9. Rollers 5 may be affirmatively rotated forwardedby means ofa chain 17 which meshes with sprockets 20 attached to the axle of each roller 5, one of said axles being rotated by means of a motor 21.

Bed plates 9 are set in motion by means of the main conveyor 8 simultaneously with activation of mechanism 11. During the process for removing the briquettes from conveyor 2, mechanism 11 provides the briquettes 1 with a speed so that they arrive on bed plates 9 in straight rows and travelling at the same speed as bed plates 9. Preferably, the forward motion of main conveyor 8 is intermittent, advancing the same distance and at the same speed with the forward motion of mechanism 11. However, if the bed plates 9 are sufficiently large to receive several rows of briquettes, intervals are produced between these rows by, after passage of each row of briquettes from the removal plate 7 to bed plate 9, the stopping of mechanism 11 sufficiently long during its (simultaneous) forward motion with bed plate 9 to establish a definite interval before the following row arrives on the bed plate 9. When this interval is established, the mechanism 11 is set in motion again.

To increase the capacity of the apparatus, a second conveyor may be arranged next to conveyor 2 which carries briquettes 1 to the roller track 4.

Furthermore, the conveyor 2 may be provided with a width whereby several rows of briquettes 1 adjacent one to the other are carried to a location wherein they can be picked up by the roller track 4. By this means, the course of briquettes 1 which reaches the track 4 may be of such a width best suited to correspond to the desired size of bed plates 9.

The mechanism 11 may comprise a support hydraulic cylinder and piston assembly 30 which receives hydraulic fluid from a hydraulic pump apparatus 22 via a hydraulic control mechanism 24 which, if desired, may also control the motor 14 which may be a hydraulic motor to ensure coordinated movement of the various parts. It would be appreciated by those skilled in the art that other means than hydraulic may be employed such as pneumatic, electric or mechanism or a combination thereof.

Although we have described a preferred embodiment of our invention, it is to be understood that it is capable of other adaptations and modifications within the scope of the appended claims.

Having thus described our invention, what we claim as new and desire to secure by Letters patent of the United States is:

1. An apparatus for conveying briquettes which have been formed in a press to bed plates, the apparatus comprising:
   a first conveyor for carrying said briquettes; a second main conveyor under said first conveyor disposed at right angles thereto, said first conveyor comprising a plurality of parallel longitudinal spaced conveying means with at least one interval therebetween;
   a substantially coplanar conveyance track provided with pivot means proximate its forward end and adapted to be inclined relative to said second conveyor, said conveyance track comprising a frame which supports a plurality of substantially coplanar roller means, a removal plate and vertical moving means provided therefor, said frame including said pivot means, said removal plate being provided with hinge means in its after part which connects it to said frame, said roller means being capable of being vertically raised in said interval to lift said briquettes from said first conveyor, the inclination of said conveyance track relative to said second conveyor being such whereby briquettes may be moved down the incline of said conveyance track from said first conveyor to said second conveyor.

2. An apparatus in accordance with claim 1 wherein the axis of rotation of said pivot means is substantially at the level of said second conveyor.

3. An apparatus in accordance with claim 2 wherein said second conveyor carries bed plates adapted to receive said briquettes from said conveyor track.

4. An apparatus in accordance with claim 1 wherein a removal mechanism is adapted to move said briquettes along said conveyance track when said roller means are in a raised position supporting said briquettes, said mechanism moving said briquettes from their location on said roller means above said first conveyor.

5. A method of conveying briquettes which have been formed in a press to bed plates which comprises the steps of performing the function of:
   conveying said briquettes on a first conveyor to a location above a second conveyor carrying said bed plates;
   placing a substantially coplanar conveyance track on an incline between said first conveyor and said second conveyor;
   causing said coplanar conveyance track to raise under said briquettes and lift them vertically from said first conveyor, and while said briquettes are so raised, transporting them on said conveyance track towards said second conveyor away from their location above said first conveyor;
   carrying said bed plates by said second conveyor under and proximate the lower end of said conveyance track, said bed plates being moved in the direction of said briquettes on said conveyance track, moving said briquettes down the incline of said conveyance track onto said bed plates, the moving of said bed plates and said briquettes being intermittent and simultaneous at substantially the same speed, said briquettes being moved together in rows down said conveyance track incline for shorter periods of time whereby as each said row is received by said bed plate, an interval is formed before said bed plate received the succeeding row.

6. A method in accordance with claim 5 wherein said conveyance track is reciprocated vertically relative to said first conveyor.

7. A method in accordance with claim 6 wherein said first conveyor is provided with slots, parts of said conveyance track being raised through said slots to lift said briquettes from said first conveyor.

* * * * *